Patented Aug. 1, 1967

3,334,327
SNAP-IN TERMINAL
Alexander M. Anspach, Jr., Claremont, Calif., assignor to General Dynamics Corporation, Pomona, Calif., a corporation of Delaware
Filed Apr. 5, 1965, Ser. No. 445,623
7 Claims. (Cl. 339—217)

ABSTRACT OF THE DISCLOSURE

The disclosure relates to a snap-in nail head type of terminal structure comprising a cylindrical shank member topped by a flat nail head, the shank having an enlarged portion with suitably angled shoulders. The angle of the lower shoulder assists in squeezing the terminal and its enlarged shank portion through a semi-rigid header board so that the terminal snaps into place with the header board being engaged between the upper angled shoulder and the nail head, this spacing being determined by the thickness of the header board. If necessary, as in a cross-welding type welding operation, an optional shank may extend upwardly from the nail head.

---

This invention relates to terminal structures, particularly to terminal structures for electronic module header boards, and more particularly to a terminal structure constructed so as to provide quick and effective installation.

One of the problems developed by the advent of electronic module assemblies is how to provide a good terminal for external interconnection which can be easily positioned in the header board of the module with the least amount of time required while still providing an effective reliable connection with the components within the module. Prior to this invention various types of terminals and methods for installing same in the header boards have been utilized in an effort to overcome this problem. While satisfactory terminal and installation procedures have been developed to meet most of the technical requirements, the cost of such prior procedures due to the time required has been excessive since the prior methods required sealing of the terminals on the underside of the board and curing of the sealant.

The terminal structure of this invention overcomes the above problems in that the installation method is a simple procedure which requires only one firm flat surface such as a table top and a header board with the proper terminal locations. No sealing or curing is required because the terminal is so constructed as to provide its own seal against the header board. In addition the terminal of this invention can be readily utilized with either "surface" welding or "cross" welding techniques for making electrical interconnections. When installing the illustrated modified embodiment, a simple tool having the proper hole dimension for the extended shank can be utilized in place of the flat surface.

Therefore, an object of this invention is to provide a novel terminal structure.

A further object of the invention is to provide a terminal particularly adapted for module positioner boards.

Another object of the invention is to provide a terminal which is easy to install and which is so constructed as to be self-sealing thereby substantially reducing the time required for installation as compared with prior known terminals.

Another object of the invention is to provide a terminal structure which may be utilized with either surface or cross welding techniques.

Another object of the invention is to provide a terminal which has a low profile head thus being particularly adapted for surface welding techniques utilizing interconnecting material which has a fusible metal thereon.

Other objects of the invention will become readily apparent from the following description and accompanying drawings wherein.

Figure 1:
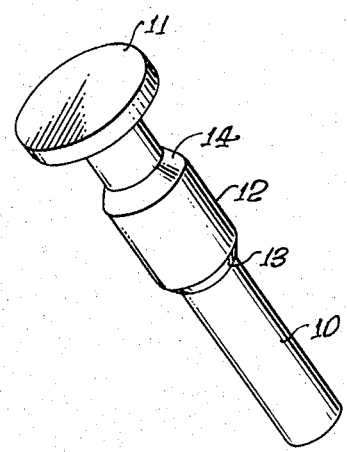
FIG. 1 is a perspective view of an embodiment of the invention.
Figure 2:
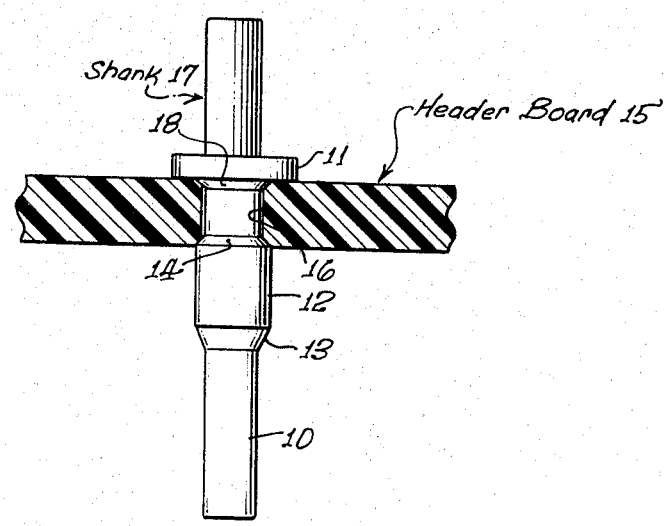
FIG. 2 is a view partially in cross-section illustrating the FIG. 1 embodiment positioned in a header board, a modification of the terminal being shown by the optional shank.

Referring now to the drawings, the embodiment of the invention illustrated in FIGS. 1 and 2 comprises a cylindrical shank member 10 having one end thereof topped by a flat head 11, the shank 10 having an enlarged portion 12 with suitably angled shoulders 13 and 14. The flat head 11 is shown as having a circular configuration with the shank centered therein which eliminates orientation problems. However, other head configurations can be employed. An angled surface or shoulder 18 extends from the lower surface of head 11 to the shank 10, the angle of surface 18, for example, being approximately 20°.

As pointed out above, the method of installation of the inventive terminal is a simple procedure which doesn't require any special tools except the simple tool described above for the FIG. 2 embodiment. All that is required for installation is a firm flat surface such as a table top (not shown) and a header or positioner board 15 with terminal location apertures 16 therein. The shank member 10 of the terminal is partially inserted into each location aperture 16, with the head 11 on the side of board 15 that will be externally connected. The end of the shank member 10 which is opposite head 11 serves to interconnect, for example, the internal components of a module (not shown) which does not constitute part of this invention and therefore has not been illustrated. With the shank 10 of the terminal partially inserted in the header board 15, the board is then turned upside down and placed on the flat surface of head 11 of the terminal. Pressure is then applied locally about the terminal being installed, in a downward direction, until the terminal is snapped into place in board 15. The angle of the lower shoulder 13 of enlarged shank portion 12 assists in squeezing the terminal and its enlarged shank portion through the semi-rigid header board 15 so that the terminal snaps into place with the header board being engaged between the upper angled shoulder 14 of enlarged shank portion 12 and the flat bottom surface of head 11.

The terminal of the invention can be installed in a header board in substantially less time than the prior known terminals since no sealing is required because the shoulder 14 on the enlarged portion 12 of shank 10 is designed to provide a mechanical seal with the header board 15 on one side while the angled surface 18 provides a seal on the opposite side of board 15.

One advantage of the inventive nail head type terminal is its versatility. It can accommodate many types of module header boards. It can be inserted into epoxy glass boards or installed in the plastic header caps of potting cup type modules. It can also be inserted into "strip line" type terminal headers. The design can accommodate thick or thin header boards. All that is required for each different application is an adjustment between the bottom surface of the head 11 of the terminal and the enlarged shank portion 12, and in some instances, a slight adjustment in the angle of shoulder 13 and the angled surfaces 14 and 18. This angle adjustment may be needed because different materials have different properties. Making the angle 13 sharper would make the insertion of the terminal in the header easier.

Another advantage of this nail head type terminal over other type terminations is the angled shoulder 14. Other terminals require a sealing operation before the module encapsulating operation, because seepage around the terminals occurred thus contaminating the terminal. A cleaning operation was required before the next welding operation could be performed. The angled shoulder 14 and the angled surface 18 on the terminal of this invention are designed to provide a seal between the header material and the terminal thus no sealing operation is required. This feature alone can save a substantial amount of fabrication time, thus reducing cost.

Still another advantage of the present terminal is the design of the enlarged shank portion 12. The angled surface 18 under flat head 11, combined with the angled shoulder 14 of enlarged portion 12, holds the terminal firmly in place after installation. Straight shank nail head terminals have a tendency to fall out requiring re-installation many times during the course of the header board assembly. If desired, the angled surface 18 may be omitted with the shoulder 14 providing satisfactory sealing and holding capabilities.

The structural material of this terminal will generally consist of nickel. Although a specific material is set forth comparable results may be obtained with other materials.

If one of the terminals of this invention should get damaged after installation it can be removed almost as easily as it is installed. The installation procedure is simply reversed although slightly more pressure is required.

The flat head of the terminal is particularly adapted to surface welding applications utilizing electronic transmission material which has a coating of a suitable fusible metal thereon so that the weld operation can be accomplished when only one side or surface of the materials to be connected is available for contact with the welder electrodes.

For applications which utilize the cross welding technique, the shank 10 of the terminal can be extended through head 11 as shown in FIG. 2 at 17. The length of the shank portion 17 can be any desirable length, diameter, or configuration. If desirable, the extension shank 17 can be attached to the top surface of flat head 11 by any conventional method.

It has thus been shown that the terminal of the invention provides a quick and effective manner of overcoming he undesirable feature of the prior known terminals. This is accomplished due to the novel angled shoulder of the terminal shank which serves to hold the terminal firmly in place while providing a seal between the terminal and the associated unit in which it is installed.

Although a particular embodiment of the invention has been illustrated and described, modifications and changes will become apparent to those skilled in the art, and it is intended to cover all such modifications and changes as fall within the true spirit and scope of the invention.

What I claim is:

1. In combination with a header board, a terminal positioned in an aperture in said header board; said terminal comprising a shank portion and a head portion, said shank portion including an angled surface extending therefrom to said head portion, said shank portion being provided with an enlarged area having an angled surface at each end thereof; said enlarged area of said shank portion being smaller in cross-section than the cross-section of said head portion, said terminal being fixedly held in and sealed with respect to said header board by engagement of said header board between one of said angled surfaces and said head portion.

2. The combination defined in claim 1, wherein said head portion is substantially flat.

3. The combination defined in claim 1, wherein said head portion is located at one end of said shank portion and is substantially flat with a circular periphery.

4. In combination: a header board and a snap-in type terminal; said snap-in type terminal comprising a shank member, said shank member including a first enlarged cross-sectional portion and a second enlarged cross-sectional portion; said first enlarged portion being located at a predetermined position on said shank member and including a pair of substantially flat surface portions substantially parallel with each other; said second enlarged portion being circular in cross-section and having a diameter smaller than the cross-section of said first enlarged portion and located on said shank member in a predetermined spaced relationship with respect to said first enlarged portion; said shank member additionally including three tapered portions, the first and second of said tapered portions extending from said shank member to substantially the outer diameter of each end of said second enlarged diameter shank portion, the third of said tapered portions extending from said shank member to the flat surface portion of said first enlarged shank portion adjacent said second enlarged shank portion, said first tapered portion assists the insertion of the terminal through an aperture in said header board, such that said first and second enlarged shank portions are on opposite sides of said header board, and the second and third tapered portions serve in combination to retain and seal the terminal in said header board.

5. The combination defined in claim 4, wherein said first enlarged cross-sectional portion of said shank member is located at one end of said shank member, and wherein one of said substantially flat surface portions of said first enlarged shank portion defines a substantially flat surface across said one end of said shank member.

6. The combination defined in claim 4, wherein said first cross-sectional portion of said shank member is located a predetermined distance from one end of said shank member, whereby a portion of said shank member extends outwardly from said header board.

7. The combination defined in claim 4, wherein said first enlarged cross-sectional portion of said shank member has a thickness extending along the longitudinal axis of said shank member less than the second enlarged cross-sectional portion thickness extending along the longitudinal axis of said shank member.

References Cited

UNITED STATES PATENTS

| | | | |
|---|---|---|---|
| 2,383,926 | 8/1945 | White | 339—61 |
| 2,857,580 | 10/1958 | Raetsch | 339—221 X |
| 2,919,300 | 12/1959 | Carlson. | |
| 2,995,617 | 8/1961 | Maximoff et al. | 339—221 X |
| 2,999,221 | 9/1961 | Ellis et al. | 339—217 X |
| 3,093,887 | 6/1963 | Prestige et al. | 339—221 X |
| 3,101,229 | 8/1963 | Yopp | 339—217 X |

FOREIGN PATENTS

| | | |
|---|---|---|
| 840,563 | 7/1960 | Great Britain. |

MARVIN A. CHAMPION, *Primary Examiner.*

P. TEITELBAUM, *Assistant Examiner.*